Figure 1:
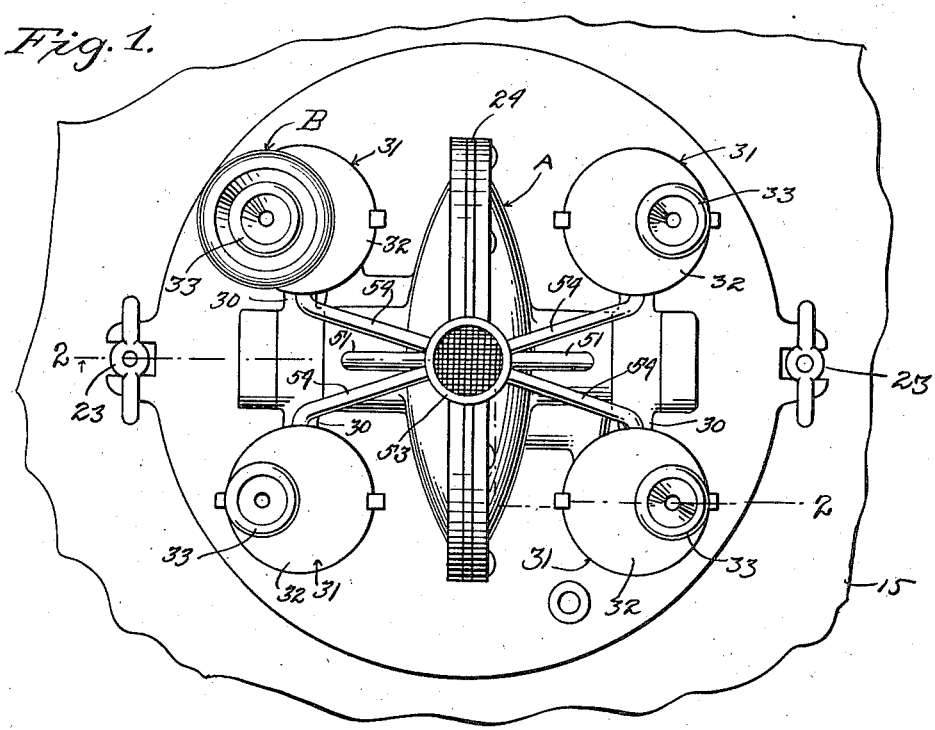

E. A. LAUGHLIN.
MILKING MACHINE.
APPLICATION FILED APR. 24, 1915.

1,193,402.

Patented Aug. 1, 1916.
3 SHEETS—SHEET 1.

Witnesses
Inventor
E. A. Laughlin
By
Attorney

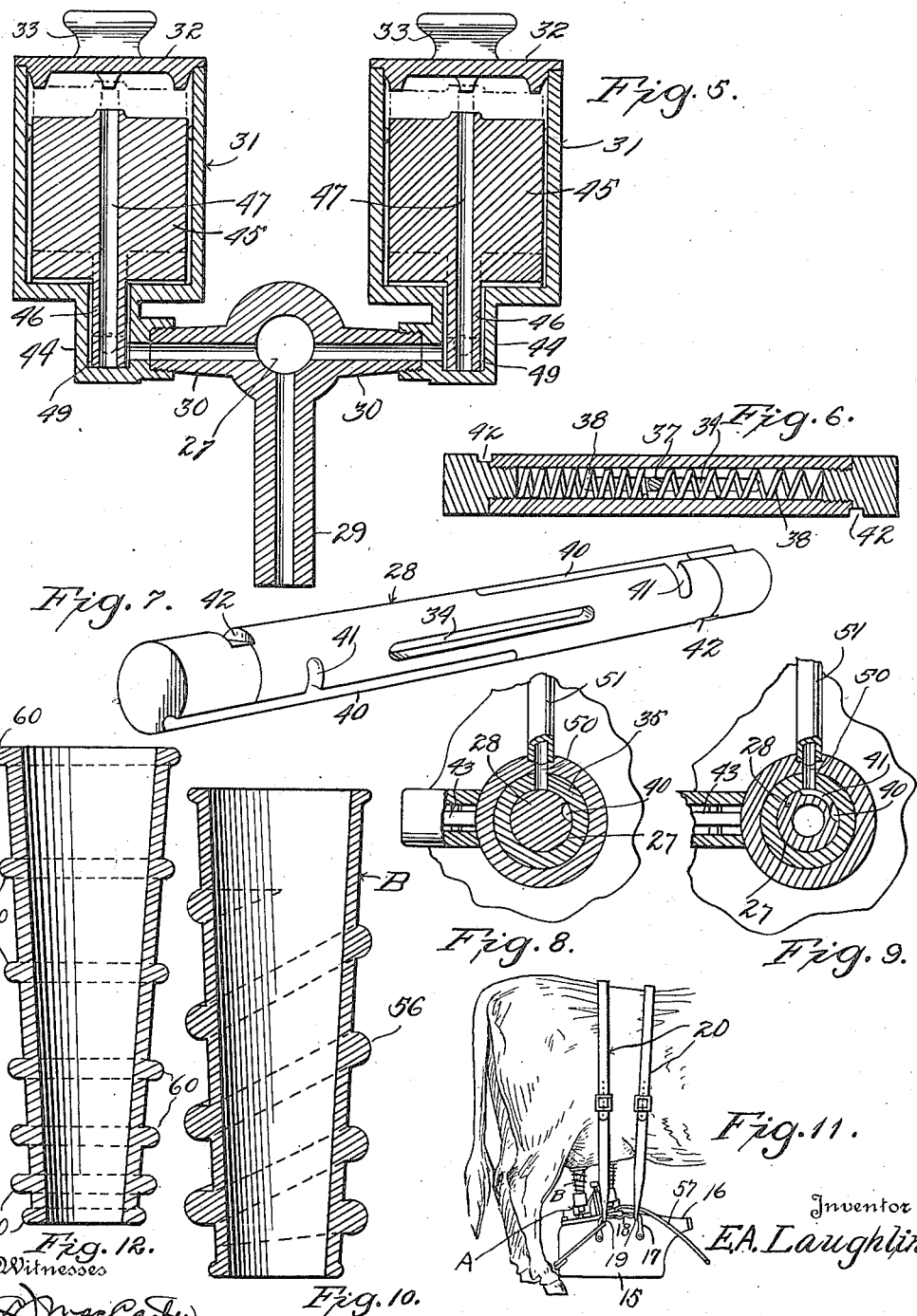

UNITED STATES PATENT OFFICE.

ELMYR A. LAUGHLIN, OF CHICAGO, ILLINOIS.

MILKING-MACHINE.

1,193,402.  Specification of Letters Patent.  Patented Aug. 1, 1916.

Application filed April 24, 1915. Serial No. 23,668.

*To all whom it may concern:*

Be it known that I, ELMYR A. LAUGHLIN, a citizen of the United States, residing at Chicago, in the county of Cook, State of Illinois, have invented certain new and useful Improvements in Milking-Machines; and I do hereby declare the following to be a full, clear, and exact description of the invention, such as will enable others skilled in the art to which it appertains to make and use the same.

This invention relates to milking machines.

Heretofore it has been customary to locate the can and pulsator some distance away from the animal and connect the teat cups to the pulsator through the medium of a long rubber hose. Under such conditions it is necessary in order to effect a pulsation of a cup to exhaust the air from the hose and then allow it to refill which naturally takes time and materially retards the operation of milking.

It is therefore my purpose to provide a machine of the type named in which the cups and the receiving can are suspended directly from the animal with a strap or belt passing over the back thereof, the cups being attached directly to the pulsator and intermediate lengths of hose, or tube which it is difficult to keep clean and sterile dispensed with.

My machine so arranged also has another distinct advantage in that the rapidity of the milking operation is greatly increased and it is a well known fact that the more rapid the cow is milked the more and richer will be the milk.

It is also my purpose to provide a milking machine embodying an improved construction for instituting the milking operation and a further improved construction designed to automatically cut out the operation of a given head of the machine when the flow of milk to that particular head ceases. In this way the machine is rendered automatic and safe so that after same is once started it does not have to be constantly watched by an attendant while at the same time guarding against injury to the animal.

I further propose to provide a milking machine in which only two of the cups are collapsed simultaneously whereby a severe strain on the animal is obviated and natural milking conditions produced.

My milking machine also embodies an improved construction of teat cup whereby the initial collapse of the cup starts at the upper end thereof and progressively descends so as to simulate the natural movement of the hand in milking.

With these and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 2:
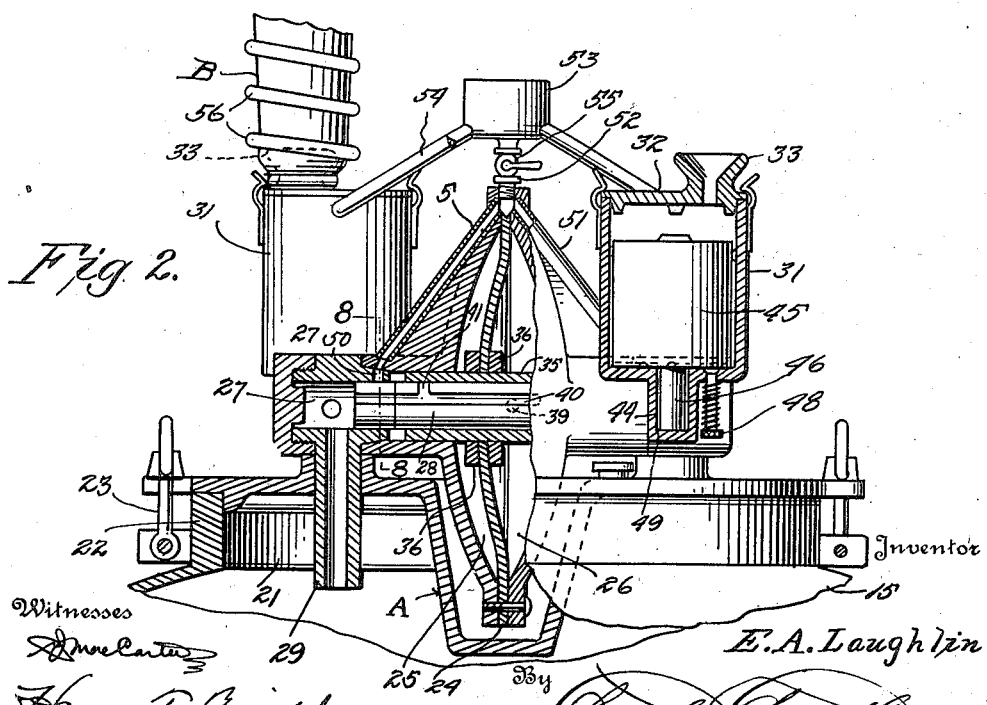
Figure 3:
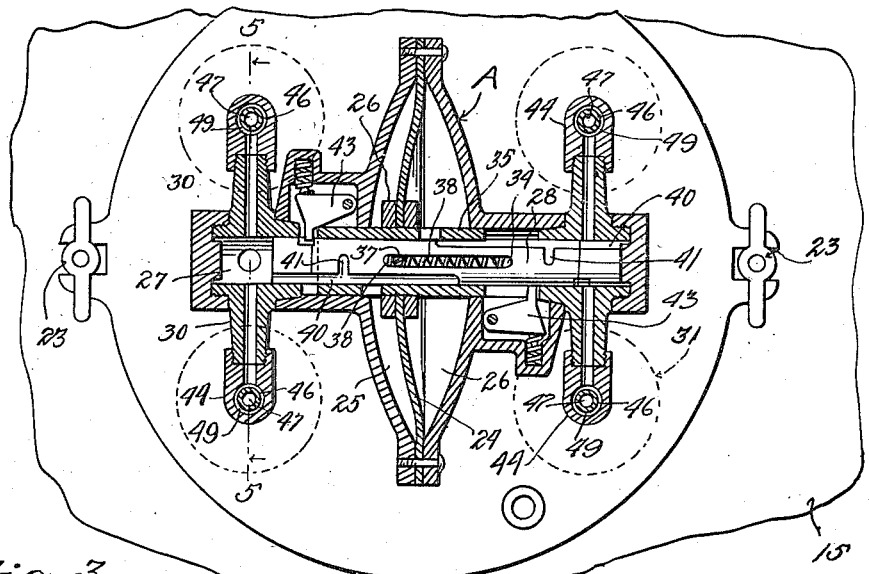
Figure 4:
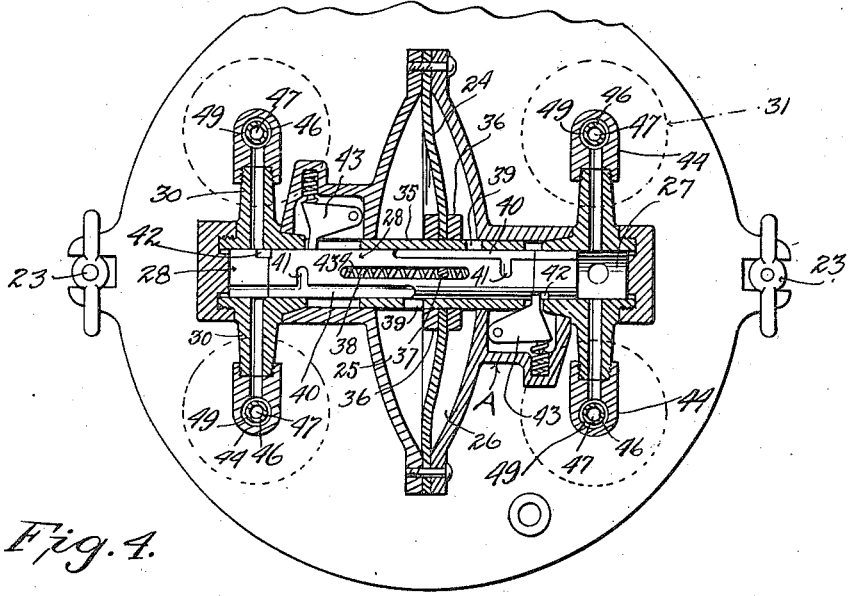

Figure 1 is a plan view of the pulsator and a fragment of the can of a milking machine constructed in accordance with the invention; Fig. 2, a section on the line 2—2 of Fig. 1; Fig. 3, a horizontal section through the pulsator with the parts in the position they would occupy just before the vacuum in the heads of the machine on the left is relieved; Fig. 4, a view similar to Fig. 2 with the parts in the position they would occupy just before the vacuum in the heads of the machine on the right is relieved; Fig. 5, a section on the line 5—5 of Fig. 3; Fig. 6, a longitudinal section of the pulsator piston; Fig. 7, a perspective view of the pulsator piston; Fig. 8, a section on the line 8—8 of Fig. 2; Fig. 9, a view similar to Fig. 8 with the parts in the position shown in Fig. 4; Fig. 10, a vertical section through one of the teat cups employed in the machine; Fig. 11, a view in elevation showing the manner of securing the device to a cow; and Fig. 12, a vertical section through a modified form of teat cup.

Referring to the drawings the improved milking machine is shown as comprising a can 15 provided with a spout 16. Secured on opposite sides of the can 15 are handles 17 provided with a plurality of notches 18 for a purpose that will presently appear. Engaged on each handle 17 are two rings 19 and secured to each ring 19 is one end of straps or belts 20. These rings 91 are adapted to be interchangeably engaged in the notches 18 so that the device may be properly adjusted to the cow.

The top of the can 15 is provided with an opening 21 surrounded by a flange 22. Secured upon the flange 22 by means of binding screws 23 is a casing A which closes the opening 21 and carries the mechanism of the pulsator.

The casing A includes an enlarged central chamber in which is mounted a diaphragm 24 dividing the enlarged central chamber into lesser chambers 25 and 26. The casing A also includes a substantially cylindrical chamber 27 in which is mounted for reciprocation a piston 28. Depending from each end of the chamber 27 is a spout 29 one end of which communicates with said chamber 27 and the other end with the interior of the can 15. Extending laterally from the casing A at each end of the chamber 27 are nozzles 30, there being two such nozzles at each end of the chamber 27 oppositely disposed. Each nozzle 30 supports at its outer end a float casing 31 and each casing 31 is provided with a removable top 32 having a nipple 33 over which is engaged the lower end of a teat cup B. The piston 28 is hollow and is provided at diametrically opposite points with longitudinal slots 34. Slidably mounted on the piston 28 is a sleeve 35 which is connected to the diaphragm 24 by means of clamping collars 36. Carried by the sleeve 35 is a pin 37 which extends through the slots 34 and is disposed between the inner ends of springs 38 which latter are confined within the piston 28. The sleeve 35 is provided on opposite sides of the diaphragm 24 with openings 39 which communicate respectively with the chambers 25 and 26 for a purpose that will presently appear. The piston 28 is provided with a pair of longitudinal grooves 40 which open through respective ends of the piston and are each provided with lateral extensions 41. The piston 28 is further provided adjacent each end with a notch 42 in which is adapted to engage a spring latch 43 for the purpose of locking the piston against movement, except under predetermined conditions that will hereinafter appear.

Each casing 31 is provided with a reduced lower end 44 and disposed in each casing 31 is a float 45 having a reduced lower end 46 operating in the reduced lower end 44 of the casing 31. This float 45 is provided with a longitudinal bore 47 which also passes through the reduced lower end 46. Each casing 31 carries a spring plunger 48 operating against the bottom of the adjacent float 45 and whereby the latter may be elevated manually to institute the operation of the particular head of the machine. A clearance 49 is provided between the reduced portion 46 and the wall of the reduced lower end 44 of the casing to form a leakage way so that when the milk stops flowing the portion already in the casing 31 leaks out through the clearance 49 and associated nozzle 30 and permits the float 45 to descend to automatically shut off the vacuum from the particular head of the machine.

Formed in the casing A adjacent each end of the chamber 27 is a free air port 50 and connected to the casing A with one end in communication with the free air port 50 is a free air pipe 51. The other end of each pipe 51 communicates with a pipe 52 depending from an air strainer 53, the latter being supported by means of braces 54 having corresponding ends connected to respective casings 31. The pipe 52 has mounted therein a valve 55 whereby the flow of air through the pipes 51 is controlled.

Each of the teat cups B is constructed of suitable rubber and comprises a tubular body tapering from its upper end in the direction of its lower end. Formed integral with each cup on the outer side thereof is a spiral rib 56, the space between the convolutions of which decreases in a direction from the top to the bottom of the cup and in addition the thickness of the rib, increases in the same direction. By this construction the cup is reinforced from its top toward its bottom progressively so that when the vacuum is formed within the cup the upper end will collapse first and such collapsed status progressively advanced toward the lower end of the cup. At the same time such a construction causes the cup to resume its original shape when the vacuum is relieved and prevents a total collapse of the cup at any point where there is nothing to resist it.

When the vacuum is created in the cup the upper end collapses and exerts a pressure inward from all directions the same as if the diameter were reduced by hand milking when the thumb and forefinger are brought together. This shuts off the supply of milk and the collapse of the cup then progresses downwardly and produces the same effect as if the first thumb and finger action were followed by the natural milking movement of the second, third and fourth fingers respectively.

In operation the can 15 is suitably connected with a vacuum pump through the medium of a hose 57. As the air is exhausted from the can 15 a vacuum is formed in the end of the chamber 27 which is free of the piston 28 and such vacuum is also transmitted through the adjacent nozzles 30 to the interior of the adjacent casings 31, the floats 45 in said casing having been manually elevated through the medium of the plungers 48. Such vacuum also occurs in the adjacent teat cups B causing the latter to collapse progressively from their tops toward their bottoms. When this occurs air is then exhausted from the chamber 25 through the groove 40 causing the diaphragm 24 to move in the direction of the suction. During this movement of the diaphragm the pin 37 compresses one of the springs 38 causing the latter to exert a pressure against the piston 28. During this movement of the diaphragm the sleeve 35 moves on the piston 28 until it engages and lifts the latch 43 out of the notch 42. As soon as the latch 43 is disengaged from the notch 42 the piston 28 moves to the other end of the chamber 27 and closes the nozzles 30 and spout 29 against the influence of the suction within the can. At the same time the heads at the opposite end of the chamber 27 are automatically brought into operation. When the piston 28 partakes of the movement just referred to the extension 41 of the groove 40 is brought into registration with the free air port 50 and the vacuum in the chamber 25 is automatically relieved by the air passing through the strainer 53, pipe 52, pipe 51, free air port 50, groove extension 41, groove 40 and port 39. Through the medium of the valve 55 the speed at which the diaphragm moves can be regulated and it will be seen that movement of the diaphragm cannot be had until the air has been exhausted from the float casings and the cups, thus making the operation of the machine automatic and independent of adjustment by the operator.

It will be noted that the nipple 33 on the top of each casing 31 is disposed eccentrically which permits quite a range of adjustment of the cups B by simply rotating the tops of the casings 31, such adjustments being exceedingly useful in properly fitting the device to a particular animal.

In the modified form of teat cup shown in Fig. 12 I provide a plurality of circumscribing ribs 60. The spaces between these ribs decrease in width and of course area from the top toward the bottom of the cup and in addition the said ribs 60 progressively increase in rigidity from the top toward the bottom of the cup. It will be obvious that when a teat cup is constructed as shown in Fig. 12 and a vacuum is formed therein said cup will collapse initially at its top and progressively downward and thus simulate the natural movement of the hand in milking.

While I have illustrated and described one form of carrying my invention into practice it will be obvious that various changes in the details of construction and in the arrangement of the parts may be resorted to without departing from the scope of the invention as set forth in the appended claims.

What is claimed is:—

1. In a milking machine, the combination of a can adapted for attachment to an air exhausting device, a pulsator rigid with the can and automatically operated by the exhaust of air from the can, teat cup supports on the pulsator, teat cups carried by the supports and operatively connected to the pulsator, and means for suspending the can bodily from the animal in correct relation for the application of the teat cup.

2. In a milking machine, the combination of a plurality of teat cups, a pulsator operatively connected with said cups and adapted to simultaneously exhaust air from a predetermined number of the cups and simultaneously supply air to the remainder of the cups, said pulsator including a reciprocating piston adapted in its movement to control the supply and exhaust of air to and from the cups, a movable diaphragm secured to the piston for actuating the latter, and means for effecting movement of the diaphragm subsequent to the exhaust and supply of air to respective sets of cups.

3. In a milking machine, the combination of a pulsator, a float casing operatively connected to the pulsator, a float in said casing adapted to normally close communication between the pulsator and casing and actuated by the accumulation of milk in the casing to hold open communication between the latter and pulsator, and a teat cup connected to the float casing and communicating therewith.

4. A teat cup comprising a flexible tubular shell, a spiral rib formed integral with the shell on the outer side thereof, said rib increasing in thickness from the upper toward the lower end of the cup.

5. A teat cup comprising a flexible tubular shell, a spiral rib formed integral with the shell on the outer side thereof, the convolutions of said rib approaching each other in a direction from the top to the bottom of the cup.

6. In a milking machine, the combination of a can adapted for attachment to an air exhausting device, a pulsator rigidly secured to the can and automatically operated by the exhaust of air from the can, teat cups operatively connected to and directly supported by the pulsator, and means for adjusting said cups relatively to their support.

7. In a milking machine the combination of a float casing having a milk outlet therein, and a float in said casing normally closing the milk outlet and adapted to be elevated by the accumulation of milk in the casing to open the milk outlet, said float having a longitudinal passage through which the milk is adapted to flow to the milk outlet.

8. In a milking machine the combination of a float casing having a milk outlet therein, a float in said casing normally closing the milk outlet and adapted to be elevated by the accumulation of milk in the casing to open the milk outlet and having a longitudinal passage through which the milk is adapted to flow to the milk outlet, and means for draining the accumulated milk from the casing when the flow of milk thereto ceases.

9. In a milking machine the combination of a float casing having a milk outlet therein, a float in said casing normally closing the milk outlet and adapted to be held in position to open the outlet by accumulated milk in the casing, and a spring retracted lifter carried by the casing and manually operable to elevate the float independent of accumulated milk to allow the casing to fill the float independent of accumulated milk to allow the casing to fill.

In testimony whereof, I affix my signature, in the presence of two witnesses.

ELMYR A. LAUGHLIN.

Witnesses:
M. S. FRASER,
THOS. S. NORTONE.